United States Patent [19]
Akatsuka et al.

[11] Patent Number: 5,840,824
[45] Date of Patent: Nov. 24, 1998

[54] EPOXY RESIN, EPOXY RESIN COMPOSITION AND HARDENED PRODUCT THEREOF

[75] Inventors: Yasumasa Akatsuka, Saitama-ken; Kenichi Kuboki, Chiba-ken; Yoshio Shimamura, Tokyo; Ryoichi Hasegawa, Saitama-ken, all of Japan

[73] Assignee: Nippon Kayaku Kabushiki Kaisha, Tokyo, Japan

[21] Appl. No.: 773,967

[22] Filed: Dec. 26, 1996

[30] Foreign Application Priority Data

Dec. 28, 1995 [JP] Japan .................................. 7-352295

[51] Int. Cl.$^6$ .......................... C08G 59/00; C08G 65/08; C08G 65/14
[52] U.S. Cl. ............................ 528/97; 523/443; 523/466; 525/481; 525/484; 549/560
[58] Field of Search ...................................... 523/443, 466; 525/481, 484; 528/97; 549/560

[56] References Cited

U.S. PATENT DOCUMENTS 3,632,555  1/1972  Harris et al. .............................. 528/86
5,459,223  10/1995 Sue et al. .................................. 528/153

*Primary Examiner*—Frederick Krass
*Attorney, Agent, or Firm*—Nields, Lemack & Dingman

[57] ABSTRACT

An object is to provide hardened products having excellent water resistance and mechanical strength, and an epoxy resin and an epoxy resin composition for use in the production thereof. An epoxy resin obtained by the glycidylation of a novolak type resin which is prepared by the condensation of biphenyls with phenols and naphthols, and a resin composition containing said epoxy resin and hardened products thereof.

5 Claims, No Drawings

EPOXY RESIN, EPOXY RESIN COMPOSITION AND HARDENED PRODUCT THEREOF

FIELD OF THE INVENTION

The invention relates to an epoxy resin and an epoxy resin composition which provide a hardened product with excellent water resistance and mechanical strength.

PRIOR ARTS

Epoxy resins become hardened products which generally have excellent mechanical properties, water resistance, chemical resistance, heat resistance, electrical properties and the like when hardened with a curing agent and are used in the broad range of fields such as of adhesives, paints, laminated sheets, molding materials, casting materials and the like. As the most frequently used epoxy resins in the industrial level, there are liquid and solid bisphenol A type epoxy resins which are obtained by allowing bisphenol A to react with epichlorohydrin. In addition to these resins, uninflamable solid epoxy resins which are obtained by allowing a liquid bisphenol A type epoxy resin to react with tetrabromobisphenol A are industrially used as general-purpose epoxy resins.

However, the general-purpose epoxy resins described above have a disadvantage in that the heat resistance of hardened products obtained by hardening them decreases as their molecular weight increases, though their toughness increases. Also, when they are mixed with cresol novolak epoxy resin or the like polyfunctional epoxy resin in order to compensate decrease in the heat resistance, the resulting hardened products show increased heat resistance, but entailing other problems in terms of reduced toughness and increased water absorption. On the other hand, with the recent remarkable development in electronic industries and the like, strictness of water resistance and mechanical strength (toughness) required for electrical insulating materials and the like for use in these industries are increasing more and more, and Japanese Patent Application Kokai No. 6-271654(1994) discloses an epoxy resin produced by the glycidyl etherification of a novolak type resin which is obtained by condensing 4,4'-di(ω-substituted methyl) biphenyl and the like with naphthols, but, since the novolak type resin to be used as a starting material is apt to receive oxidation, viscosity increment occurs when the glycidyl etherification is not carried out immediately after the condensation reaction, thus causing poor working efficiency of this product. In consequence, great concern has been directed toward the development of an epoxy resin from which the product is excellent in the aforementioned characteristics and whose starting material hardly receives oxidation and which is excellent in working efficiency.

SUMMARY OF THE INVENTION

In view of these situations, the inventors of the present invention have conducted intensive studies and found as the result that an epoxy resin having a specified molecular structure is the epoxy resin which is free from the aforementioned problems, thereby resulting in the accomplishment of the present invention.

Accordingly, the present invention provides (1) an epoxy resin represented by the formula (1)

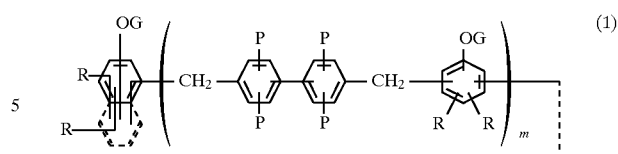
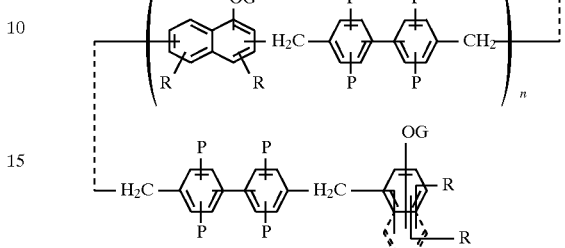

(in the formula (1), each of m and n is an average value and exceeds 0 but is not more than 10, each of P and R represents a hydrogen atom, a halogen atom, a saturated or unsaturated alkyl group having 1 to 8 carbon atoms, an allyl group or an aryl group, wherein P and R may be the same or different from each other, G represents a glycidyl group, and the group

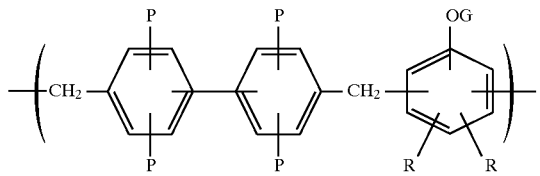

and the group

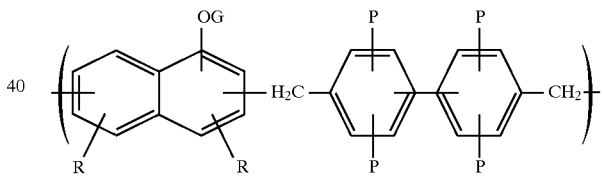

are aligned in an optional order),
(2) an epoxy resin composition which comprises the epoxy resin described in the above item (1) and a curing agent,
(3) the epoxy resin composition described in the above item (2) wherein it further comprises an inorganic filler, and
(4) a hardened product which is obtained by hardening the epoxy resin composition described in the above item (2) or (3).

In the aforementioned formula (1), m is preferably 0 to 10, more preferably 0 to 8, and n is preferably 0 to 10, more preferably 0 to 8.

Also, in the substituent groups P and R, hydrogen atom is preferred and also preferred are chlorine atom or bromine atom as the halogen atom and methyl group or propyl group as the saturated or unsaturated alkyl group having 1 to 8 carbon atoms, and a case in which P and R are all hydrogen atoms is particularly preferred.

DETAILED DESCRIPTION OF THE INVENTION

The epoxy resin represented by the aforementioned formula (1) can be obtained for example by carrying out reaction of a novolak type resin represented by the formula (2)

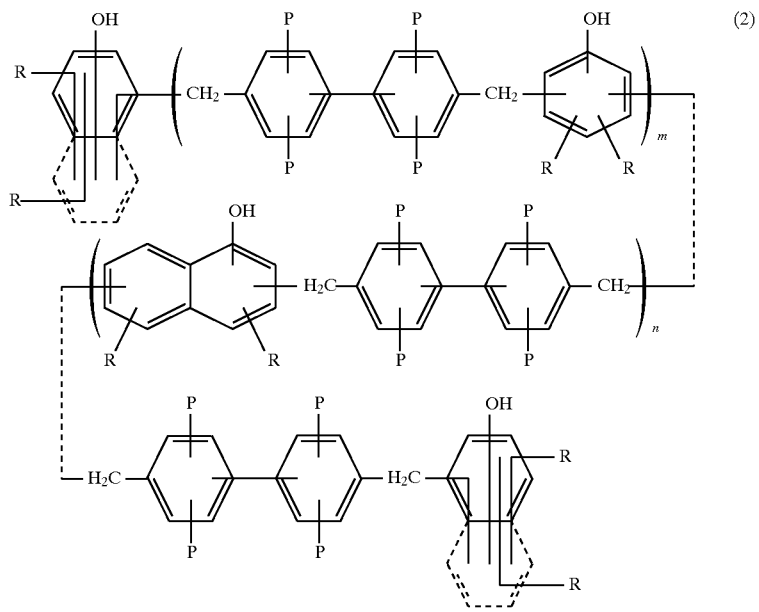

(in the formula (2), m, n, P and R are as defined in the formula (1), and the group

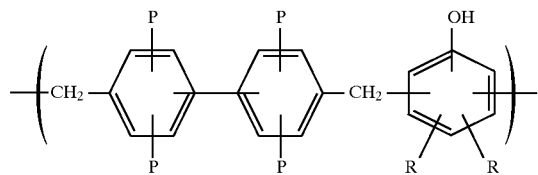

and the group

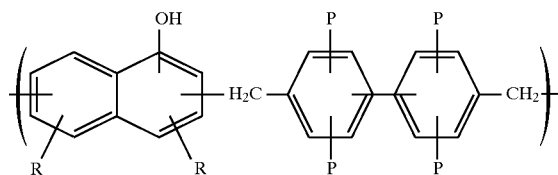

are aligned in an optional order) with an epihalohydrin in the presence of an alkali metal hydroxide.

The compound represented by formula (2) can be obtained for example by allowing a compound represented by the formula (3)

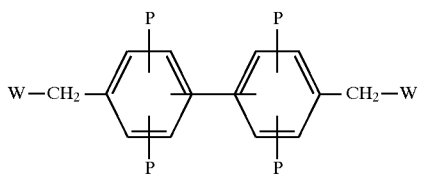

(in the formula (3), W represents a halogen atom, hydroxyl group or a lower alkoxy group, and P is as defined in the formula (1)) to undergo condensation reaction with phenols and naphthols in the presence of an acid catalyst.

In W of the formula (3), chlorine atom or bromine atom is preferred as the halogen atom, and methoxy group, ethoxy group or the like is preferred as the lower alkoxy group.

Illustrative examples of useful compounds represented by the formula (3) include biphenyldimethanol, bischloromethylbiphenyl, bisbromomethylbiphenyl, bismethoxymethylbiphenyl, bisethoxymethylbiphenyl and the like, of which biphenyldimethanol, bischloromethylbiphenyl and bismethoxymethylbiphenyl are preferred.

Illustrative examples of phenols to be used for the preparation of the compound of formula (2) include o-, m- or p-isomers of phenol, cresol, ethylphenol, n-propylphenol, isobutylphenol, t-butylphenol, octylphenol, nonylphenol, xylenol, methylbutylphenol, di-t-butylphenol and the like, alkenylphenols such as allylphenol, propenylphenol and the like, cycloalkylphenols such as cyclopentylphenol, cyclohexylphenol, cyclohexylcresol and the like, substituted phenols such as phenylphenol and the like, and halogenated phenols such as monobromophenol, dibromophenol and the like, of which phenol, cresol or xylenol is preferred. Illustrative examples of useful naphthols include α-naphthol, β-naphthol and various constitutional isomers of methylnaphthol, ethylnaphthol, monobromonaphthol, dibromonaphthol, allylnaphthol and the like, of which α-naphthol or β-naphthol is preferred. These phenols or naphthols may be used alone or as a mixture of two or more, but one or more of the phenols and naphthols are respectively used.

When the aforementioned condensation reaction is carried out, the phenols and naphthols are used in a total amount of generally from 0.3 to 20 mol, preferably from 0.4 to 15 mol, based on one mol of the compound of formula (3). The ratios of the phenols to naphthols can be selected at will within the molar ratio of 5–95:95–5.

An acid catalyst is used in the aforementioned condensation reaction. Though various compounds can be used as the catalyst, an inorganic or organic acid such as hydrochloric acid, sulfuric acid, p-toluenesulfonic acid, oxalic acid or the like or a Lewis acid such as boron trifluoride, anhydrous aluminum chloride, zinc chloride or the like is desirable, and p-toluenesulfonic acid, sulfuric acid or hydrochloric acid is particularly desirable. The amount of these acid catalysts is not particularly limited, but it is desirable to use them in an amount of from 0.1 to 30% by weight of the compound of formula (3).

The aforementioned condensation reaction can be carried out without solvent or in the presence of an organic solvent.

Illustrative examples of the useful organic solvent include methyl cellosolve, ethyl cellosolve, toluene, xylene, methyl isobutyl ketone and the like. The organic solvent may be used in an amount of preferably from 50 to 300% by weight, more preferably from 100 to 250% by weight, based on the total weight of used starting materials. The reaction temperature is preferably within the range of from 40° to 180° C., and the reaction time is preferably within the range of from 1 to 10 hours. These solvents may be used alone or as a mixture of two or more. In addition, from the viewpoint of effecting quick reaction, it is desirable to distill off water, alcohols and the like formed during the reaction from the reaction system, using a fractionating column and the like.

After completion of the reaction, water washing treatment is carried out until the pH value of the washing solution becomes 3 to 7, preferably 5 to 7. When the water washing treatment is carried out, various basic substances may if necessary be used as neutralizing agents, which include alkali metal hydroxides such as sodium hydroxide, potassium hydroxide and the like, alkaline earth metal hydroxides such as calcium hydroxide, magnesium hydroxide and the like, ammonia, sodium dihydrogenphosphate and organic amines such as diethylenetriamine, triethylenetetramine, aniline, phenylenediamine and the like. The water washing treatment may be carried out in accordance with the usual method. For example, water in which the aforementioned neutralizing agents are dissolved is added to the reaction mixture, and the partition extraction procedure is repeated.

After the neutralization treatment, evaporation of the solvent and un-reacted materials and concentration of the formed compound are carried out by heating the reaction mixture under a reduced pressure, thereby obtaining the novolak type resin of formula (2).

Known epoxidation method can be employed as a method for the production of the epoxy resin of the present invention from the compound represented by formula (2). For example, the epoxy resin of the present invention can be obtained by allowing a dissolved mixture of the compound of formula (2) obtained by the aforementioned method and excess amount of epichlorohydrin, epibromohydrin or the like epihalohydrin to undergo 1 to 10 hours of reaction at 20° to 120° C., after adding or while adding sodium hydroxide, potassium hydroxide or the like alkali metal hydroxide.

In the reaction for the production of the epoxy resin of the present invention, the alkali metal hydroxide may be used as its aqueous solution, and, in that case, the reaction may be effected by a method in which said aqueous solution of alkali metal hydroxide is continuously added to the reaction system, while water and epihalohydrin are continuously evaporated under a reduced pressure or ordinary pressure and simultaneously separated to remove water and recycle the epihalohydryn continuously into the reaction system.

In an alternative method, a dissolved mixture of the compound of formula (2) and an epihalohydrin is allowed to undergo 1 to 5 hours of reaction at 50° to 150° C. in the presence of tetramethylammonium chloride, tetramethylammonium bromide, trimethylbenzylammonium chloride or the like quaternary ammonium salt as a catalyst, and the thus obtained halohydrin-etherified compound of formula (2) is mixed with an alkali metal hydroxide in the form of solid or aqueous solution and subjected to 1 to 10 hours of reaction at a temperature of from 20° to 120° C. to effect dehydrohalogenation (cyclization). In this case, the quaternary ammonium salt may be used in an amount of generally from 1 to 10 g, preferably from 2 to 8 g, per one hydroxyl group of the compound of formula (2).

In general, the amount of the epihalohydrin to be used in these reactions is generally from 1 to 20 mol, preferably from 2 to 10 mol, per one hydroxyl group equivalent of the compound of formula (2). The amount of the alkali metal hydroxide to be used is 0.8 to 1.5 mol, preferably 0.9 to 1.1 mol, per one hydroxyl group equivalent of the compound of formula (2). In addition, in order to promote progress of the reaction, it is desirable to carry out the reaction by adding methanol, ethanol and the like alcohols, as well as dimethyl sulfone, dimethyl sulfoxide and the like aprotic polar solvents and the like.

When alcohols are used, they may be used in an amount of from 2 to 20% by weight, more preferably from 4 to 15% by weight, based on the amount of epihalohydrin. Also, when an aprotic polar solvent is used, its amount is 5 to 100% by weight, more preferably 10 to 90% by weight, based on the amount of epihalohydrin.

After washing with water or without washing, the product of epoxidation reaction is heated under a reduced pressure, namely at 110° to 250° C. under a pressure of 10 mmHg or less, to remove epihalohydrin, solvent and the like. Also, in order to obtain an epoxy resin containing less hydrolyzable halogen, the cyclization can be effected more securely by dissolving the thus obtained epoxy resin in toluene, methyl isobutyl ketone or the like solvent, adding an aqueous solution of sodium hydroxide, potassium hydroxide or the like alkali metal hydroxide and carrying out the subsequent reaction. In that case, the alkali metal hydroxide may be used in an amount of preferably from 0.01 to 0.3 mol, more preferably from 0.05 to 0.2 mol, per one hydroxyl group equivalent of the compound of formula (2) used in the epoxidation. The reaction temperature is 50° to 120° C., and the reaction period is generally 0.5 to 2 hours.

After completion of the reaction, the formed salt is removed by filtration, water washing or the like means, and toluene, methyl isobutyl ketone or the like solvent is evaporated by heating under a reduced pressure, thereby obtaining the epoxy resin of the present invention containing less hydrolyzable chlorine.

The following describes the epoxy resin composition of the present invention. In the epoxy resin composition of the present invention, the epoxy resin of the present invention may be used alone or jointly with other epoxy resins. When used jointly, the ratio of the epoxy resin of the present invention to the total epoxy resins is preferably 30% by weight or more, more preferably 40% by weight or more.

Illustrative examples of the epoxy resin to be used jointly with the epoxy resin of the present invention include a novolak type epoxy resin, a bisphenol A type epoxy resin, a bisphenol F type epoxy resin, a biphenyl type epoxy resin and the like, which may be used alone or as a mixture of two or more.

The epoxy resin composition of the present invention contains a curing agent. As the curing agent, amine base compounds, acid anhydride base compounds, amide base compounds, phenolic compounds and the like can be exemplified. Though not particularly limited, illustrative examples of useful curing agents include diaminodiphenylmethane, diethylenetriamine, triethylenetetramine, diaminodiphenyl sulfone, isophoronediamine, dicyandiamide, a polyamide resin synthesized from linolenic acid dimer and ethylenediamine, phthalic anhydride, trimellitic anhydride, pyromellitic anhydride, maleic anhydride, tetrahydrophthalic anhydride, methyltetrahydrophthalic anhydride, methylnadic anhydride (General Name: Methyl endo methylene tetrahydrophthalic anhydride) hexahydrophthalic anhydride, methylhexahydrophthalic anhydride, phenol novolak, and modified products thereof, imidazole, $BF_3$-amine complexes, guanidine derivatives and the like. These curing agents may be used alone or as a mixture of two or more.

In the epoxy resin composition of the present invention, the curing agent may be used in an amount of preferably from 0.7 to 1.2 equivalents per one epoxy group equivalent of the epoxy resin. When the amount is less than 0.7 equivalent or larger than 1.2 equivalents per one epoxy group equivalent, excellent physical properties of the hardened product may not be obtained due to incomplete hardening.

In addition, the aforementioned curing agent may be used jointly with a cure accelerator with no problems. Illustrative examples of the cure accelerator to be used include 2-methylimidazole, 2-ethylimidazole, 2-ethyl-4-methylimidazole and the like imidazoles, 2-(dimethylaminomethyl)phenol, 1,8-diaza-bicyclo(5,4,0) undecene-7 and the like tertiary amines, triphenylphosphine and the like phosphines and tin octylate and the like metal compounds. The cure accelerator may be used as occasion demands in an amount of from 0.1 to 5.0 weight parts per 100 weight parts of the epoxy resin.

The epoxy resin composition of the present invention may contain an inorganic filler as occasion demands. Illustrative examples of the inorganic filler to be used include silica, alumina, talc and the like. The inorganic filler may be used in such an amount that it occupies 0 to 90% by weight of the epoxy resin composition of the present invention. In addition, various blending agents such as silane coupling agents, stearic acid, palmitic acid, zinc stearate, calcium stearate and the like releasing agents, pigments and the like can be added to the epoxy resin composition of the present invention.

The epoxy resin composition of the present invention can be obtained by uniformly mixing the aforementioned components in a predetermined ratio. The epoxy resin composition of the present invention can be made into its hardened product easily by a method similar to the conventionally known method. For example, the hardened product of the present invention can be obtained by uniformly mixing the epoxy resin with a curing agent and, if necessary, further with a cure accelerator, an inorganic filler or other blending agents, making use of an extruder, a kneader, a roller or the like as occasion demands, thereby obtaining the epoxy resin composition of the present invention, which is subsequently melted, molded by casting or using a transfer molding machine or the like and then heated at 80° to 200° C. for 2 to 10 hours.

Alternatively, a hardened product may be obtained by a method in which a base material such as glass fiber, carbon fiber, polyester fiber, polyamide fiber, alumina fiber, paper or the like is impregnated with a solution of the epoxy resin composition of the present invention prepared by dissolving it in toluene, xylene, acetone, methyl ethyl ketone, methyl isobutyl ketone or the like solvent, the resulting base material is dried by heating, and the thus obtained pre-preg is molded by hot press. In this case, the solvent is used in such an amount that it occupies generally 10 to 70% by weight, preferably 15 to 65% by weight, of the mixture of the epoxy resin composition of the present invention and said solvent.

Since the hardened product of the present invention obtained in this manner is excellent in heat resistance, water resistance and mechanical strength, it can be used in a broad range of fields where heat resistance, water resistance and high mechanical strength are required. Illustratively, it is useful as all kinds of electric and electronic materials such as sealing materials, laminated sheets, insulating materials and the like. It also can be used in the field of molding materials, adhesives, composite materials, paints and the like.

EXAMPLES

Next, the present invention is described more illustratively with reference to examples, and, unless otherwise noted, the term part as used in the following is part by weight.

Synthesis Example 1

A flask equipped with a thermometer, a dropping funnel, a condenser tube, a fractionating column and a stirrer was charged with 107 parts of a compound represented by the following formula (4)

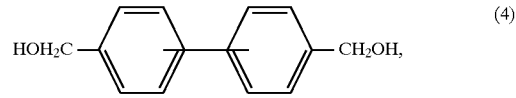

75 parts of phenol and 115 parts of α-naphthol, and the contents were stirred at room temperature while blowing nitrogen. To this was slowly added 0.5 part of p-toluenesulfonic acid (monohydrate), with a caution for exothermic reaction so that the liquid temperature did not exceed 50° C. Thereafter, this was heated to 1200° C. in an oil bath, formed water was drawn out using the fractionating column and then the reaction was carried out for 5 hours. After completion of the reaction, this was mixed with 500 ml of methyl isobutyl ketone, transferred into a separating funnel and washed with water. The washing step was repeated until the washing solution became neutral, and then the solvent was removed from the organic layer by heating under a reduced pressure, thereby obtaining 175 parts of a novolak type resin (A) represented by the aforementioned formula (2) in which P and R are both hydrogen atoms. Softening point of the thus obtained novolak type resin (A) was 86.5° C., and its hydroxyl group equivalent was 222 g/eq. Also, when a portion of the reaction solution was sampled after completion of the reaction and amounts of the remaining phenol and α-naphthol were measured by a gas chromatography, the molar ratio of the reacted phenol to α-naphthol was calculated to be 35:65.

Synthesis Example 2

The reaction of Synthesis Example 1 was repeated except that the charging amounts of phenol and α-naphthol were changed to 94 parts of phenol and 72 parts of α-naphthol, thereby obtaining 167 parts of a novolak type resin (B). Hydroxyl group equivalent of the thus obtained novolak type resin (B) was 213 g/eq, and its softening point was 81.5° C. Also, when amounts of the remaining phenol and α-naphthol were measured in the same manner as described in Synthesis Example 1, the molar ratio of the reacted phenol to α-naphthol was calculated to be 55:45.

Example 1

While purging with nitrogen gas, a flask equipped with a thermometer, a condenser tube and a stirrer was charged with 111 parts of the novolak type resin (A) obtained in Synthesis Example 1, 278 parts of epichlorohydrin and 70 parts of dimethyl sulfoxide, and the contents were dissolved. After heating to 45° C., 20.2 parts of flaky sodium hydroxide (99% in purity) was added thereto in small portions over 90 minutes, and the reaction was carried out at 45° C. for 2 hours and then at 70° C. for 1 hour. After completion of the reaction, dimethyl sulfoxide and epichlorohydrin were distilled off by heating at 130° C. under a reduced pressure, and the resulting residue was dissolved in 280 parts of methyl isobutyl ketone.

Next, the thus prepared methyl isobutyl ketone solution was heated to 70° C., mixed with 5 parts of an aqueous solution containing 30% by weight of sodium hydroxide, subjected to 1 hour of reaction and then washed with water repeatedly until the washing solution became neutral. Thereafter, the water layer was separated and removed, and methyl isobutyl ketone was distilled off from the oil layer by heating under a reduced pressure making use of a rotary evaporator, thereby obtaining 132 parts of an epoxy resin (C) of the present invention represented by the aforementioned formula (1) in which P and R are both hydrogen atoms.

Softening point of the thus obtained epoxy resin was 75.2° C., and its epoxy equivalent was 298 g/eq.

Example 2

The epoxidation reaction of Example 1 was repeated except that 107 parts of the novolak type resin (B) obtained in Synthesis Example 2 was used, thereby obtaining 129 parts of an epoxy resin (D) of the present invention. Softening point of the thus obtained epoxy resin was 72.1° C., and its epoxy equivalent was 290 g/eq.

Examples 3 and 4

Each of the epoxy resins (C) and (D) obtained in Examples 1 and 2 was blended with phenol novolak (83° C. in softening point and 106 g/eq in hydroxyl group equivalent) as a curing agent and triphenylphosphine (TPP) as a cure accelerator at the ratio shown in the column, composition of blends, of Table 1, and the mixture was kneaded with a roller at 70° C. for 15 minutes, subjected to 180 seconds of transfer molding at 150° C. under a molding pressure of 50 kg/cm$^2$ and then hardened at 160° C. for 2 hours and then at 180° C. for further 8 hours to give test pieces, and the thus prepared test pieces were used for the measurement of their water absorption and Izod impact test values under the following conditions. The results are shown in Table 1. In the table, the values of the column, composition of blends, are weight part.

Water absorption

Test piece (hardened product): 50 mm in diameter
3 mm in thickness disc
Increasing ratio (%) of weight after 24 hours of boiling in water of 100° C.

Izod impact test value (Kj/m$^2$)
Measured in accordance with the procedure of JIS K-6911

TABLE 1

|  | Example 3 | Example 4 |
| --- | --- | --- |
| Composition of blends |  |  |
| Epoxy resin (C) | 100 |  |
| Epoxy resin (D) |  | 100 |
| Phenol novolak | 36 | 37 |
| TPP | 1 | 1 |
| Physical properties of hardened product |  |  |
| Water absorption | 0.58 | 0.60 |
| Izod impact test value | 26.5 | 27.2 |

It is evident from Table 1 that hardened products of the epoxy resin of the present invention show low water absorption and high mechanical strength.

EFFECT OF THE INVENTION

Since the epoxy resin of the present invention can provide hardened products having excellent water resistance and mechanical strength, it finds versatile use in such applications as molding materials, casting materials, laminating materials, paints, adhesives, resists and the like. In addition, the material of the epoxy resin of the present invention hardly receives oxidation and therefore is excellent in working efficiency.

We claim:

1. An epoxy resin represented by the formula (1)

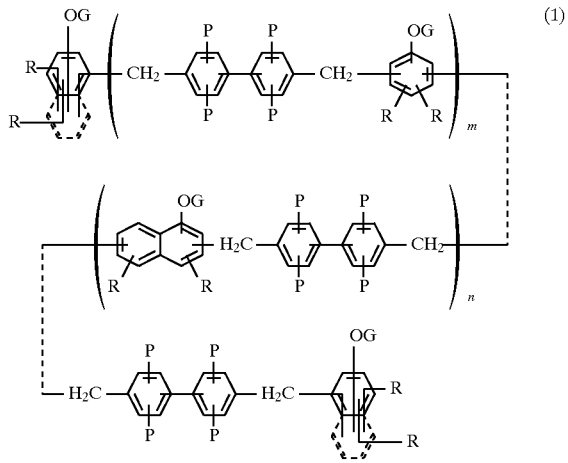

wherein in the formula (1), each of m and n is an average value and exceeds 0 but is not more than 10, each of P and R represents a hydrogen atom, a halogen atom, a saturated or unsaturated alkyl group having 1 to 8 carbon atoms, an allyl group or an aryl group, wherein P and R may be the same or different from each other, and G represents a glycidyl group.

2. An epoxy resin composition which comprises the epoxy resin of claim 1 and a curing agent.

3. The epoxy resin composition according to claim 2 wherein it further comprises an inorganic filler.

4. A hardened product which is obtained by hardening the epoxy resin composition of claim 2 or 3.

5. The epoxy resin of claim 1, wherein the order of alignment of the group:

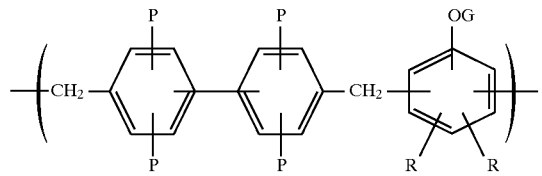

and of the group:

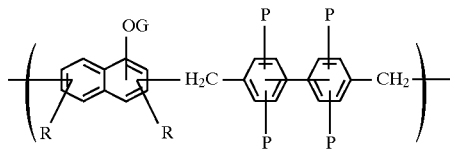

is reversed.

* * * * *